United States Patent [19]

McNesby et al.

[11] Patent Number: 5,185,799
[45] Date of Patent: Feb. 9, 1993

[54] PARALLEL SCRAMBLER USED IN SONET DATA TRANSMISSION

[75] Inventors: John McNesby, Mesa, Ariz.; Amritpal S. Kalla, Cupertino, Calif.; Angel Rodriguez, Jackson, N.J.

[73] Assignee: Siemens Aktiengesellschaft, Berlin and Munich, Fed. Rep. of Germany

[21] Appl. No.: 835,639

[22] Filed: Feb. 13, 1992

Related U.S. Application Data

[63] Continuation-in-part of Ser. No. 619,155, Nov. 28, 1990.

[51] Int. Cl.⁵ .............................................. H04K 1/00
[52] U.S. Cl. ............................. 380/28; 380/44; 380/49; 380/50
[58] Field of Search .................. 380/28, 42, 43, 44, 380/47, 48, 49, 50

[56] References Cited

U.S. PATENT DOCUMENTS

| | | | |
|---|---|---|---|
| 4,202,051 | 5/1980 | Davida et al. | 380/46 X |
| 4,531,022 | 7/1985 | Pioli | 380/46 X |
| 4,736,419 | 4/1988 | Roe | 380/28 X |
| 4,965,881 | 10/1990 | Dilley | 380/50 |
| 4,977,593 | 12/1990 | Ballance | 380/48 X |

Primary Examiner—Tod R. Swann
Attorney, Agent, or Firm—Joseph S. Codispoti

[57] ABSTRACT

A data scrambler circuit which adds the SONET polynomial $1 + X^6 + X^7$ to data in a parallel format to thereby reduce circuitry clock rates to one-eighth the line rate, which reduces power consumption and simplifies timing constraints. A circuit embodiment includes a first series of flip-flops connected to generate the polynomial and a second series of flip-flops for holding the generated polynomial. To provide a relatively large window of time for looking at the data, parallel data is obtained by providing a parallel-to-parallel register at the output of a serial-to-parallel register. The parallel data is added to the held polynomial by a series of exclusive OR gates.

5 Claims, 5 Drawing Sheets

PARALLEL SCRAMBLER USED IN SONET DATA TRANSMISSION

This is a continuation-in-part of application Ser. No. 7/619,155, filed Nov. 28, 1990 still pending.

BACKGROUND OF THE INVENTION

This invention relates to digital communications systems and, more particularly, to a SONET data transmission system which is an optical fiber system, in which data is scrambled.

Optical fiber technology is now commonly used in data transmission systems such as telephone systems and in this system, typically, there is an optical unit which includes a fiber optic transmitter channel and a fiber optic detector channel. The fiber optic transmitter channel includes a scrambler and other modules and the fiber optic detector channel includes a descrambler, a frame detector and other modules and feeds into a multiplexer demultiplexer unit which includes an activity detector for detecting the presence of data on transmission lines and an errored frame detector.

A relatively new transmission standard has been developed for Synchronous Optical Network (SONET), which is derived from a base rate and format, combined with a multiplexing scheme. This results in a modular family of rates and formats available for use in optical interfaces. The base rate is known as the Synchronous Transport Signal level 1 (STS-1). Each STS-1 frame is a serial bit stream of 810 bytes, with each byte including eight bits. The STS-1 framing is dedicated to the first two bytes A1 and A2 of each STS-1 frame. The framing pattern for bytes A1 and A2 is F628 Hex (1111011000101000), where A1 equals F6 Hex (11110110) and A2 equals 28 Hex (00101000). A C1 identification byte follows bytes A1 and A2. Higher rates (STSN) in SONET are accomplished by byte interleave multiplexing an N number of STS-1 frames. The framing pattern for an STS-3 frame in an Optical Carrier level 3 (OC-3) system is then A1A1A1A2A2A2. Similarly, the framing pattern for an STS-12 frame in an OC-12 system is twelve A1 bytes followed by twelve A2 bytes.

SONET scrambling requirements are a frame synchronous scrambler of sequence length 127, operating at the line rate. SONET Specifications propose a serial scrambler where the output from the X; position shall be added to the serial data stream. This requires the majority of the SONET interface circuitry to operate at the line rate, which in an OC-12 system is a clock rate of 622.08 MHz.

While a serial scrambler operates satisfactorily, the circuit for its implementation requires an undesirably high speed clock rate and power consumption.

It is therefore a primary object of this invention to provide a parallel scrambling circuit for use in SONET transmission systems.

Another object of this invention is to provide a scrambling circuit requiring minimal power and operating at low line rate.

It is a further object of this invention to provide a means by which an entire byte (eight bits) of data obtained from a serial bit stream can be examined at a fraction of the clock rate.

SUMMARY OF THE INVENTION

The foregoing, and additional, objects are attained in accordance with the principles of the invention by providing a scrambler circuit in which the scrambler polynomial is added to parallel data, thereby reducing circuitry clock rates to one-eighth of the line rate. The clock rate reduction reduces power consumption and simplifies timing constraints. The parallel data is obtained by providing a parallel-to-parallel register at the output of a serial-to-parallel register so as to effectively latch the high speed data and provide a bigger window for looking at the data.

BRIEF DESCRIPTION OF THE DRAWINGS

The following will be more readily apparent upon reading the following description in conjunction with the drawings wherein.

DETAILED DESCRIPTION

Figure 1:
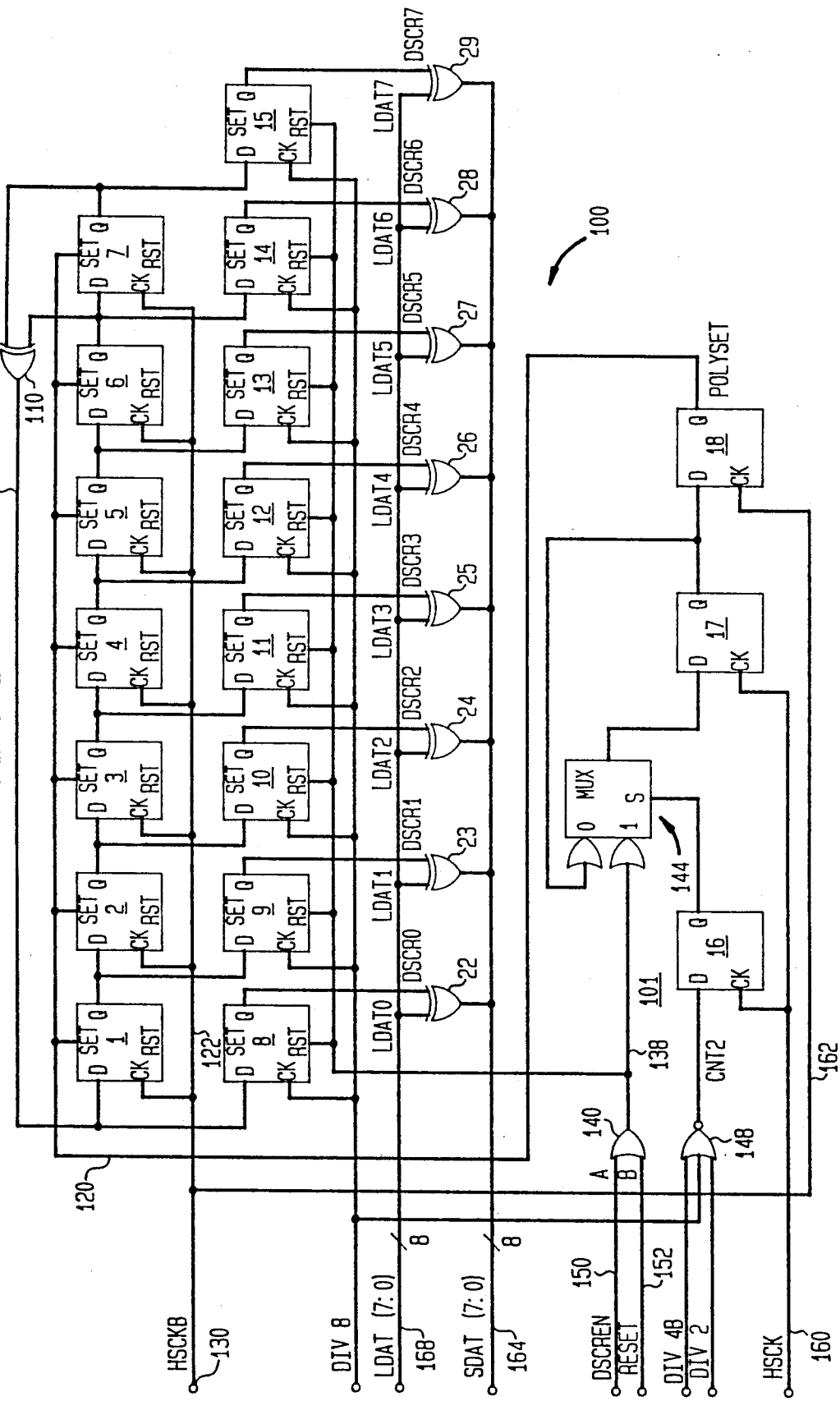
FIG. 1 is a schematic logic circuit diagram of a parallel scrambler circuit constructed in accordance with the principles of this invention.

As noted above, the data transmitter channel of a SONET system includes a module called a scrambler and the detector channel includes a module called a descrambler. Both scrambler and descrambler circuits are identical in components and the terms scrambler and descrambler may be used interchangeably.

Referring to FIG. I, a scrambler circuit 100 embodying this invention includes a first series of flip-flops 1 through 7 for generating the SONET polynomial and a second series of flip-flops 8 through 15 which capture every eighth term of the polynomial. A master exclusive OR gate 110 is associated with these flip-flops. The flip-flops 1 through 7 have their set terminals coupled together by a lead 120. The clock terminals of these flip-flops are connected together by a lead 122 to a high speed clock input 130 (HSCKB). The Q output terminal of each of these flip-flops is connected to the data terminal of the next flip-flop in the series.

The data terminals of flip-flops 1 and 8 are connected by lead 134 to the output terminal of the exclusive OR gate 110. All of the reset terminals of the flip-flops 8 through 15 are connected to lead 138 from the output of OR gate 140.

The circuit 100 includes a timing circuit 101 for enabling and disabling the scrambler. This timing circuit or timing generator includes an OR gate 140 coupled to a 2:1 (two inputs one output) multiplexer 144 and a NOR gate 148 coupled to flip-flop 16 which is coupled to the multiplexer 144. The multiplexer 144 is also coupled to series- connected flip-flops 17 and 18. A descrambler enable signal (DSCREN) is applied to lead 150 which is connected to terminal A of the input to the OR gate 140. A source of reset signal (RESET) is connected to lead 152 which is connected to the B input of OR gate 140. The output of the OR gate 140 is connected to lead 138 to the reset terminals of the flip-flops 8 through 15. This lead 138 out of OR gate 140 is also connected to an input of the multiplexer 144. The output of the multiplexer 144 is coupled to the data terminal of flip-flop 17. The output of the flip-flop 17 is connected to the data terminal of the flip-flop 18 and to an input terminal of the multiplexer 144. The output of flip-flop 18 is connected to the set lead 120.

A divide by eight clock signal (DIV8) is connected to one input of NOR gate 148, a divide by four signal (DIV4B) is coupled to the second input of the NOR gate 148 and a divide by two signal (DIV2) is coupled to the third input of the NOR gate 148. The output terminal of NOR gate 148 is connected to the data input of flip-flop 16 and the output of flip-flop 16 is coupled to the multiplexer 144. A clock input HSCK is coupled on lead 160 to the clock inputs of flip-flops 16 and 17 and the clock input of flip-flop 18 is connected by lead 162 to lead 122 from clock HSCKB.

The circuit 100 also includes a series of exclusive OR gates 22 to 29 each of which includes two input terminals. For purposes of illustration, one terminal of each is named LDAT (data) and one terminal is named DSCR. Thus, the terminals LDAT are denoted LDAT0, LDAT1 ... LDAT7 for the exclusive OR gates 22 to 29 respectively, and the terminals DSCR are similarly denoted DSCR0 to DSCR7 for these gates. All of the LDAT terminals are connected to a bus 168 (LDAT). Bus 168 (LDAT) includes eight parallel lines of data coming from a parallel-to-parallel shift register latch whose inputs come from a serial/parallel shift register the input of which receives the data in serial form. The parallel/parallel and serial/parallel registers are not shown herein. Thus, eight separate data lines are coupled to the one input of the XOR gates and LDAT0 represents one line. LDAT1 represents a second line, etc.

Also, all of the DSCR terminals are connected to the output of the associated flip-flop 8 through 15, respectively, with DSCR0 connected to flip-flop 8, DSCR1 connected to flip-flop 9, etc.

In operation of the parallel frame synchronous SONET scrambler shown in FIG. 1, first flip-flops 1 to 7 are preset to 1111111 on the last data byte of the previous frame after it has been scrambled and the preset is released on the byte following the STS-1 #N C1 (STS-1 ID) byte. This is done by DSCREN and power-up reset signals on leads 150 and 152, respectively. This byte and all subsequent bytes to be scrambled are added to the outputs of the scrambler. The frame bytes A1 and A2 and the STS-1 identification byte C1 from STS-1 #1 through STS-1 #N are not scrambled.

The scrambler (or descrambler) is enabled during all bytes of a data frame except when A1's, A2's and C1 are present at the beginning of a frame. An external signal FRMSYN (frame synch) is used to drive DSCREN which enables and disables the scrambler. The FRMSYN signal is a high level pulse whose period is 125 microseconds and whose duration is dependent on the system line rate configuration (i.e., OC-3 or OC-12). The FRMSYN signal is loosely frame aligned with the beginning of the SONET Frame and circuitry is provided to synchronize FRMSYN with the scrambler timing. The new synchronized signal is DSCREN (Descrambler enable) which is applied to lead 150 into OR gate 140.

Figure 2:
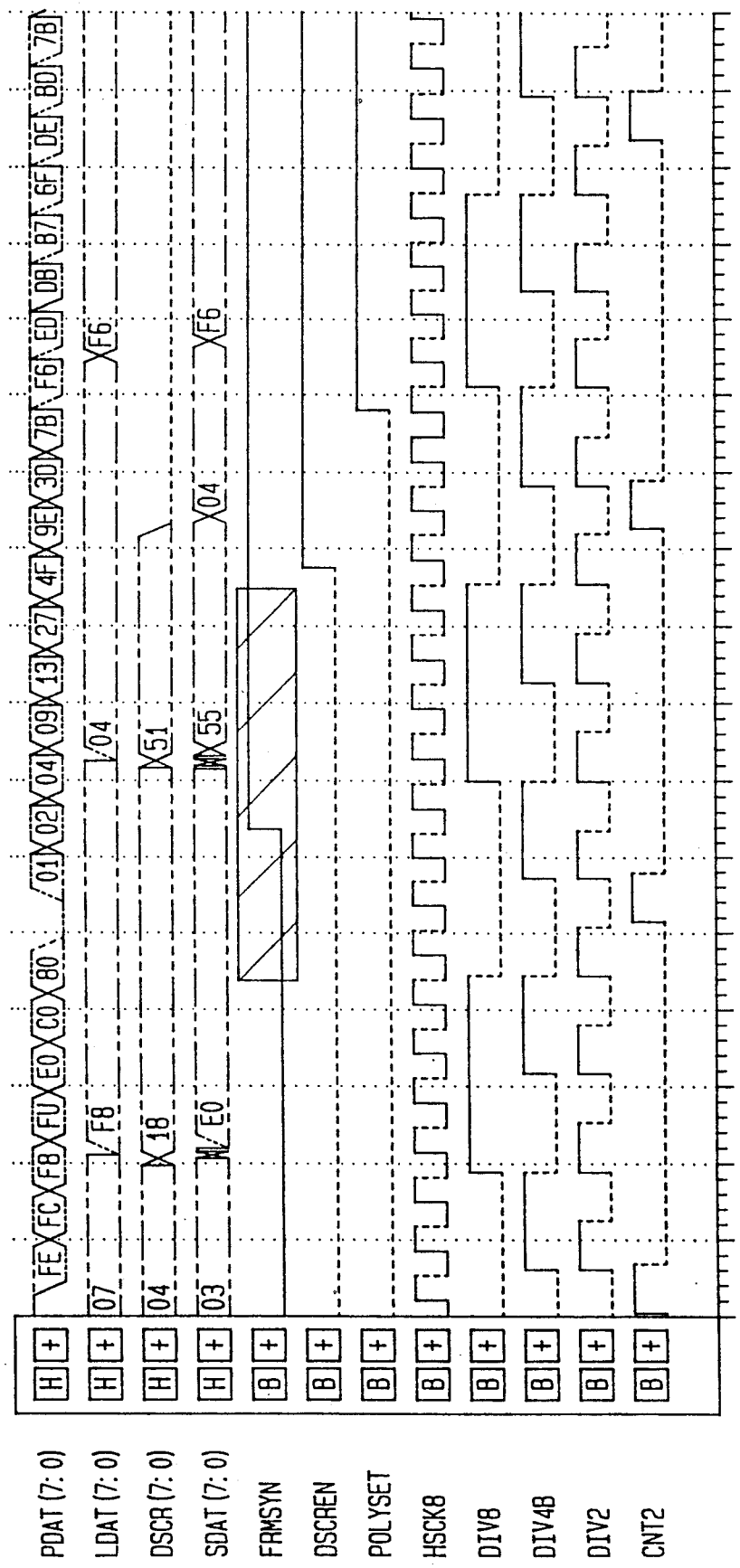
FIG. 2 shows signal relationships for disabling the descrambler.

The timing window for FRMSYN to go high is one-half period of the DIV8 clock on either side of the start of a new serial frame, where DIV8 is at one-eighth of the line rate. FRMSYN is synchronized with the Descrambler by the DIV8B clock (the inverse of DIV8 clock). FRMSYN is captured by a flip-flop clocked with DIV8B and then clocked into a flip-flop by the high speed clock, the output of which is signal DSCREN. Timing diagrams for disabling the Descrambler are shown in FIG. 2.

DSCREN on lead 150 is applied to OR gate 140 where it is OR'ed with power-up reset on lead 152 and applied to the resets of the parallel data flip-flop latches 8 through 15.

DSCREN is also applied to the SET inputs of flip-flops 1 through 7 via circuitry composed of multiplexer 144 and flip-flops 17 and 18. Flip-flops 1 through 7 and exclusive OR gate 110 implement the SONET polynomial $1+X^6+X^7$. The setting or disabling of the polynomial circuitry timing is not critical as the resetting of latches 8 through 15 isolates all outputs of the polynomial circuitry. The timing of DSCREN is such that DSCREN going high resets flip-flops 8 through 15 in the middle of the period of the DIV8 clock after the last byte of the previous frame is added to the sampled polynomial output and prior to the application of the first A1 byte of the present frame. On the application of the parallel A1 byte to exclusive OR gates 22 through 29, the reset zero (logic low) outputs of flip-flops 8 through 15 added to the parallel A1 byte by way of exclusive OR gates 22 through 29 allows the A1 byte to pass through unaltered. DSCREN remains high and flip-flops 8 to 15 remain reset during the remaining A1, A2 and C1 bytes and these bytes also pass unaltered through the adder (exclusive OR gates 22 through 29) of the descrambler. FRMSYN and DSCREN remain high and the descrambler is disabled during the processing of A1, A2, and C1 bytes.

The enabling of the descrambler occurs on the byte following the STS-1 #N C1 (STS-1 ID) byte. The FRMSYN low going signal timing window is one-half the DIV8 clock period on either side of the rising edge of the DIV8 clock that captures the last C1 byte from the serial data stream. The FRMSYN timing window for disabling (logic one or high) and enabling (logic zero or low) is one DIV8 period or eight times the line rate period. DSCREN, developed by FRMSYN being clocked by DIV8B and one high speed clock, goes low (removes reset) and enables flip-flops 8 through 15. The timing enabling (set removal) of the polynomial flip-flops 1 through 7 is critical and thus the need for OR gate 140, (2:1) multiplexer 144 and flip-flops 16, 17 and 18. The enabling of the polynomial flip-flops 1 through 7 must be delayed until after the DIV8 clock rising edge loads in the first polynomial value (FE HEX) to be added to the first data byte after the last C1 byte and before the next rising edge of HSCKB clock (inverse of the high speed clock HSCK).

The critical enabling timing of the polynomial circuitry is accomplished by decoding a two count from the timing generator with NOR gate 148 and applying it to flip-flop 16. NOR gate 148 is a DeMorgan equivalent AND gate with the inverse of input signals DIV8, DIV4B, and DIV2 decoding as a two count. The reasons for decoding a two count is that the timing generator is a count down binary counter, flip-flops 16, 17 and 18 require two and one-half high speed clocks, the polynomial flip-flops 1 through 7 must be enabled just prior to the HSCKB clock rising edge immediately following the DIV8 rising edge, and the rising edge of DIV8 clock occurs at a seven count of the timing generator.

The "two" count high speed clock wide pulse decoded from NOR gate 148 is clocked by high speed clock HSCK into flip-flop 16. The output of flip-flop 16 goes to the select input of 2:1 (two inputs and one output) multiplexer 144. The logic low output of flip-flop 16 prior to NOR gate 148 pulsing high selects the 0 input of multiplexer 144 and retains the previous value of DSCREN, which in this case is a logic high. When NOR gate 148 pulses high forcing the output of flip-flop 16 to a logic high, the output of flip-flop 16 selects the 1 input of multiplexer 144 and the low output of OR gate 140 (DSCREN is now low) for one high speed clock period. The logic low output of multiplexer 144 is sampled by flip-flop 17 with HSCK and the logic low output of flip-flop 17 is looped back to the zero input of multiplexer 144 where the select input (flip-flop 16 output) is now a logic low and is thus retained by flip-flop 17. The logic level of DSCREN is sampled every eight high speed clock pulses by NOR gate 148, flip-flop 16, and multiplexer 144 through OR gate 140. As the timing generator is clocked with HSCK and the polynomial flip-flops 1 through 7 are clocked with HSCKB, flip-flop 18 is used to retime the falling edge of the polynomial SET signal POLYSET (out of flip-flop 18) with the HSCKB clock.

With the resets of the flip-flop latches 8 through 15 and the sets of the polynomial flip-flops 1 through 7 at a logic low, the descrambler is enabled. The serial descrambler proposed in the SONET specifications would add the output of flip-flop 7 to the serial data one bit at a time. The descrambler described here is based on the fact that every eight high speed clocks the outputs of the elements of the polynomial, namely exclusive OR gate 110 and flip-flops 1 through 7, match the output of flip-flop 7 as it is added to each bit serially, where the output of exclusive OR gate 110 is the least significant bit and the output of flip-flop 7 is the most significant bit. Therefore the outputs of the elements of the polynomial can be latched every eight high speed clock pulses at the proper time, be added to parallel data and achieve the same results as adding the same data serially to the output of flip-flop 7.

To repeat the operation of the invention in somewhat greater detail, the start of a SONET frame on bus 168 (LDAT) begins with A1 and A2 bytes which are the framing pattern, and C1 bytes which are the identification bytes. These non data bytes (A1, A2, C1) pass through the circuit unchanged, i.e., neither scrambled nor descrambled. Thus, the scrambler (descrambler) is disabled when A1, A2 and C1 bytes pass through the circuit.

At this time, as noted above, flip-flops 1 through 7 are set, their Q output terminals are all ones and flip-flops 8 through 15 are reset and their Q output terminals are all zeros. The all zero outputs of flip-flops 8 through 15 are applied to a first input of each of the exclusive OR gates 22 through 29. The second input of each exclusive OR gate has one of the parallel data lines 168 (LDAT) applied to it.

Because one input of each of the exclusive OR gates 22 through 29 is zero, the other input, the data input, passes through with the data unchanged. Thus, the A1, A2 and C1 bytes pass through the exclusive OR gates 22 through 29 unchanged. As the last C1 byte passes through the exclusive OR gates 22 through 29, the reset signal is removed from flip-flops 8 through 15. The removal of the set pulse from flip-flops 1 through 7 is delayed until immediately before the divide-by-eight clock (DIV8) so that the inverted high speed clock does not prematurely change the value of the polynomial in flip-flops 1 through 7 before it is loaded into flip-flop latches 8 through 15 by the divide-by-eight clock.

After the divide-by-eight clock (DIV8) loads in a binary FE, the seven ones from flip-flops 1 through 7 and the zero from the exclusive OR gate 110, into the flip-flops 8 through 15, the set on flip-flops 1 through 7 is removed.

The outputs of flip-flop latches 8 through 15 are applied each to one input of each of the exclusive OR gates 22 through 29 and thus each such output is added to the data in the exclusive OR gate.

The inverted high speed clock (HSCKB) propagates the output of exclusive OR gate 110 through flip-flops 1 through 7. After eight high speed clock pulses, the original seven ones and a zero are propagated out of the polynomial flip-flops 1 through 7 and a new polynomial term is on the output of exclusive OR gate 110 and the seven flip-flops 1 through 7. This new polynomial is loaded into the flip-flop latches 8 through 15 and added by means of exclusive OR gates 22 through 29 to the next data byte. This continues until the next frame when just before A1 is applied to the exclusive OR gates 22 through 29, flip-flops 1 through 7 are set and flip-flop latches 8 through 15 are cleared.

Figure 3:
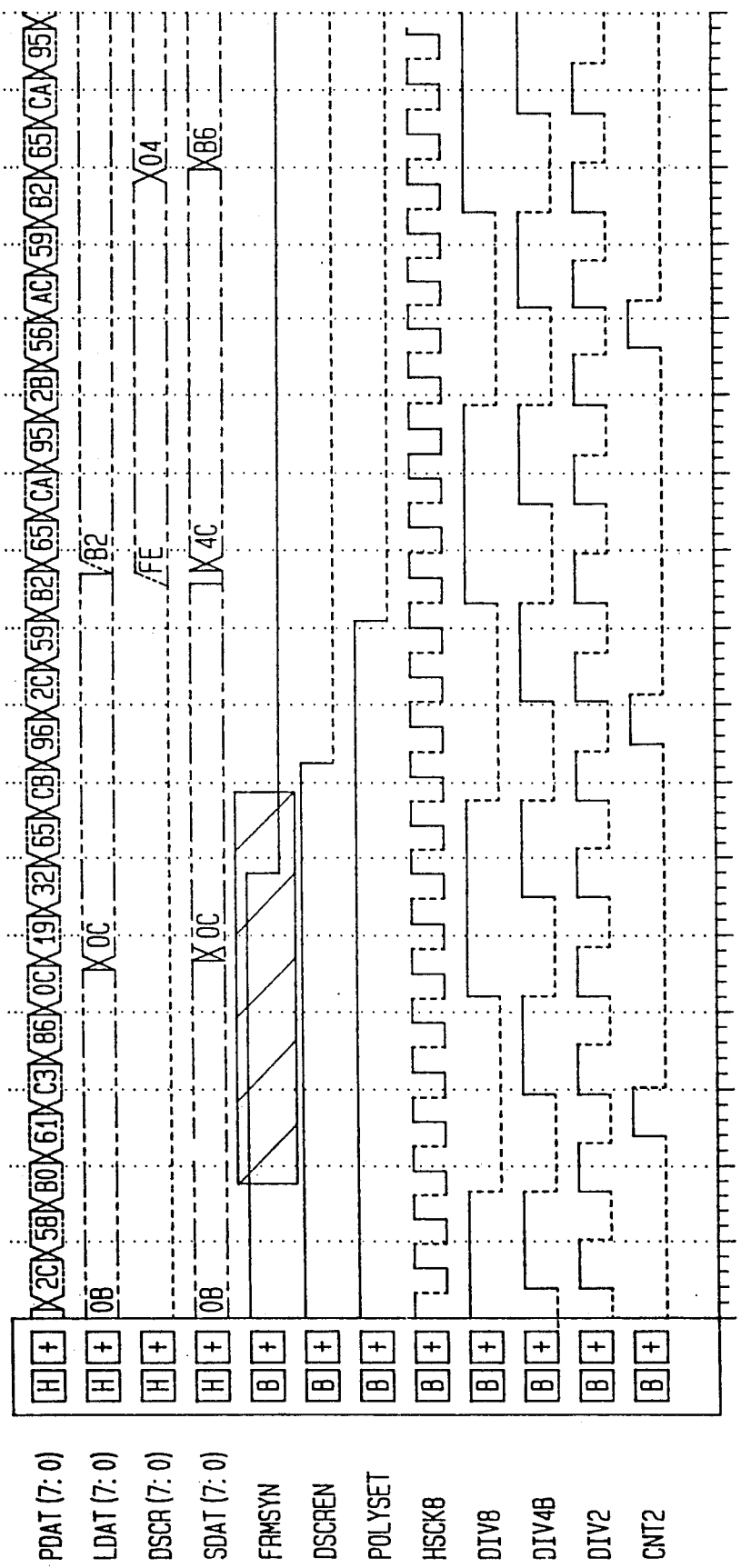
FIG. 3 shows signal relationships for enabling the descrambler.

The timing diagrams in FIGS. 2 and 3 show signal timing relationship for disabling and enabling the descrambler. PDAT(7:0) is the HEX value of the serial data as it passes through a Serial-to-Parallel Eight Bit Shift Register (S/P REG). LDAT(7:0) is the latched data (latched by a parallel-to-parallel register) outputs of the S/P REG captured by the DIV8 clock and is the parallel data input to the exclusive OR gates 22 through 29 of the descrambler. DSCR(7:0) is the HEX value outputs of the descrambler flip-flops 8 through 15. SDAT(7:0) is the HEX value results of the descrambler adding LDAT(7:0) with DSCR(7:0). FRMSYN is the external descrambler disabling and enabling signal, the crosshatched area being the allowed window of edge transition. DSCREN is the synchronized FRMSYN signal clocked by DIV8B and then HSCKB. POLYSET, derived from DSCREN, is the SET signal for polynomial flip-flops 1 through 7; the timing for this signal is most critical when the descrambler is enabled. HSCKB, the inverted high speed clock, clocks polynomial flip-flops 1 through 7. DIV8 clock is one-eighth the high speed clock. DIV4B, inverted DIV4, is one-fourth the high speed clock. DIV2 is one-half the high speed clock. CNT2 is the output of NOR gate 148, the timing generator decoded "two" count.

Figure 4:
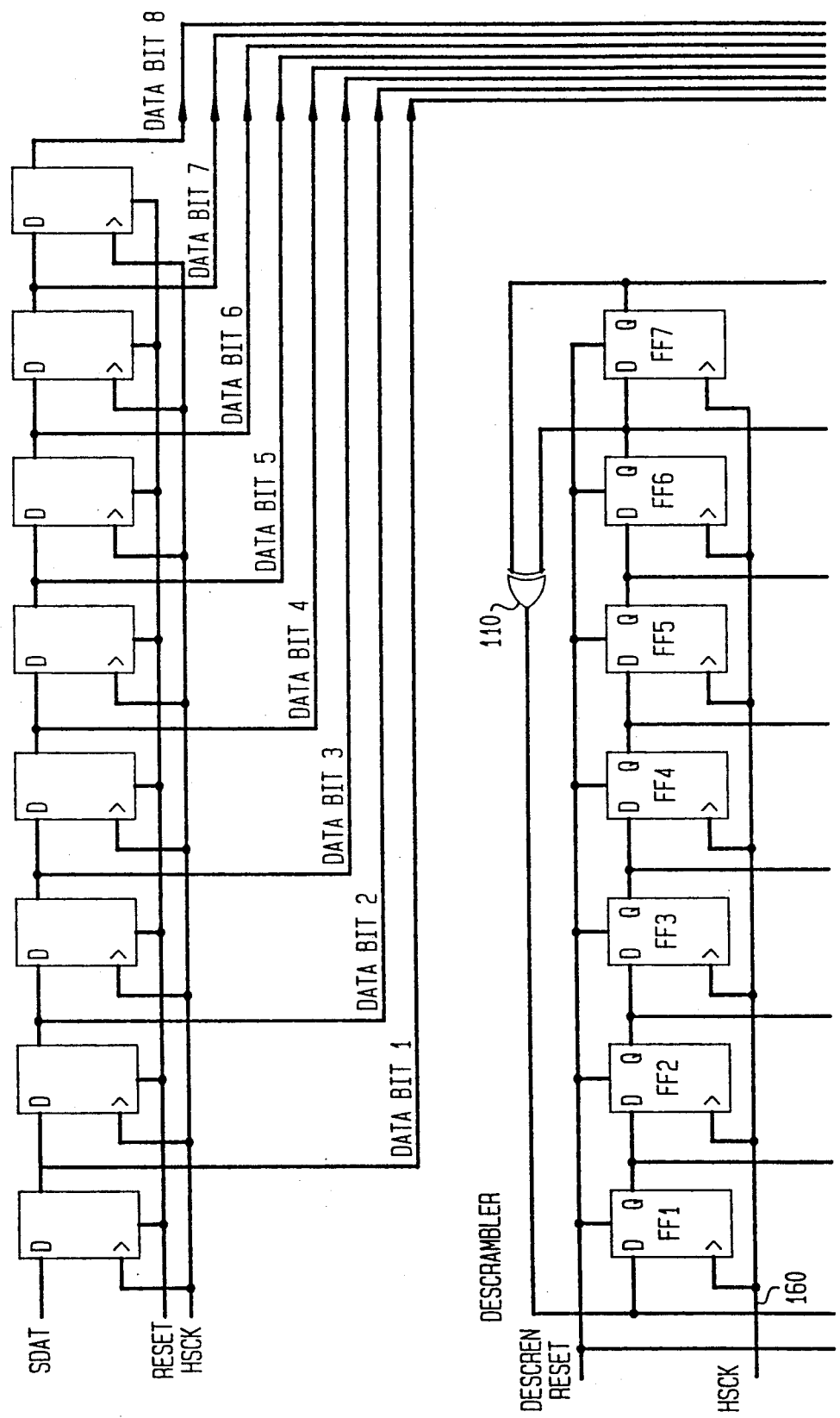
FIG. 4 shows a portion of a circuit which is used with the circuit of FIG. 1 and the algorithm for performing a descrambling function, as well as the circuitry for obtaining the parallel data.
Figure 4:
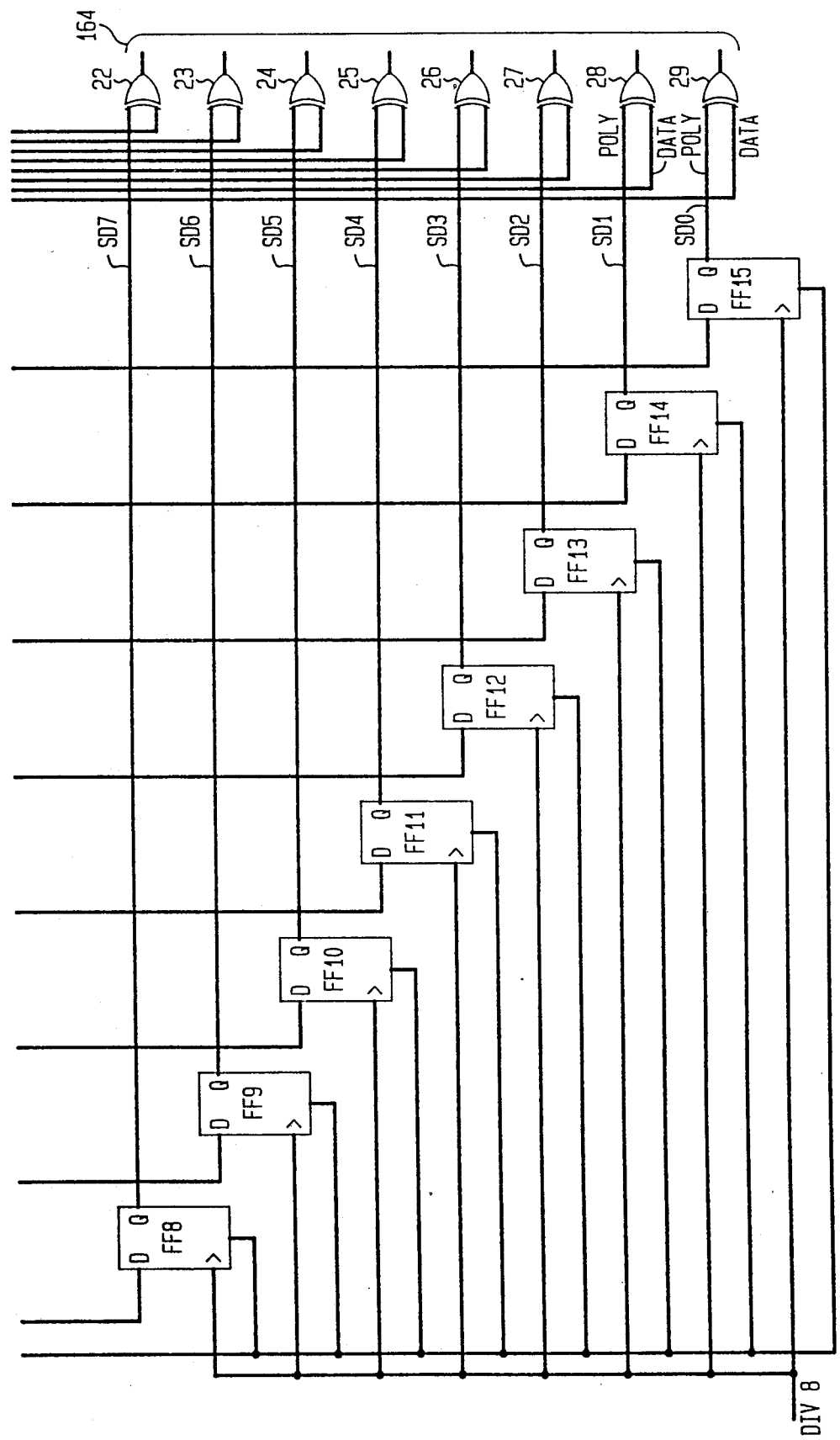

In FIG. 4, there is shown the serial-to-parallel register 180 which connects to an eight bit parallel-to-parallel register 182 from which the output leads LDAT0 through LDAT7 are coupled to the exclusive OR gates 22 through 29. In the descrambler shown in FIG. 4, the eight parallel LDAT leads and the polynomial flip-flops 8 through 15 are shown coupled to the exclusive OR gates 22 through 29. The use of the parallel-to-parallel register 182 provides a latch function which allows a slower clock to be used since it provides a bigger window for looking at the data. Thus, a window is provided during which all eight data bits are present, effectively reducing the clock rate by a factor of eight.

Accordingly, there has been described an arrangement for scrambling data with the polynomial used in the SONET telephone data handling system. While a single embodiment has been disclosed, it will be appar-

We claim:

1. A circuit for scrambling data in he form of frames of bytes of serial data wherein each frame of data includes identifying portions which are not data, said circuit comprising:
   a first series of seven flip-flops numbered one through seven for generating a scrambler polynomial to be added to data bits;
   a second series of eight flip-flops numbered eight through fifteen for generating data bits to be added with scrambler bits;
   each of said flip-flops in both series having a clock terminal, a reset terminal, a set terminal, an output terminal and an input data terminal;
   each of the second through seventh flip-flops in said first series having its input data terminal connected to the output terminal of the preceding flip-flop in said first series;
   each of the ninth through fifteenth flip-flops in said second series having its input data terminal connected to the output terminal of the first through seventh flip-flops, respectively, in said first series;
   a master exclusive OR gate having two inputs and one output, one input being connected to the interconnected output terminal and input data terminal, respectively, of said sixth and seventh flip-flops and thereby to the input data terminal of the fourteenth flip-flop;
   the second input of said master exclusive OR gate being connected to the output terminal of said seventh flip-flop and thereby to the input data terminal of said fifteenth flip-flop;
   the output terminal of said master exclusive OR gate being connected to the input data terminals of said first and eighth flip-flops;
   a first source of clock signals coupled to the clock terminals of said flip-flops in said first series;
   a second source of clock signals coupled to the clock terminals of said flip-flops in said second series;
   eight additional exclusive OR gates;
   an eight bit serial-to-parallel register coupled to receive the serial data and providing eight outputs;
   an eight bit parallel-to-parallel register coupled to the eight outputs of said serial-to-parallel register;
   a first data bus comprising eight leads each of which is coupled to a respective output of said parallel-to-parallel register, said first data bus being further connected to a first input of each of said eight additional exclusive OR gates;
   an output terminal from each flip-flop in said second series connected to a second input of an associated additional exclusive OR gate;
   a second data bus;
   the outputs of all of said additional exclusive OR gates connected to said second data bus; and
   means for disabling said circuit when said identifying portions of a frame of data are present on said first data bus.

2. The circuit of claim 1 further including a timing generator circuit for applying setting signals to the set terminals of said flip-flops in said first series and reset signals to the reset terminals of said flip-flops in said second series.

3. The circuit of claim 2 wherein said timing generator circuit includes:
   an OR gate;
   a multiplexer;
   said OR gate being in series with said multiplexer;
   a NOR gate;
   a first latch;
   a second latch;
   a third latch;
   said NOR gate being in series with said first latch, said second latch and said third latch;
   said first, second and third latches having data, clock and output terminals;
   said OR gate having two input terminals and one output terminal;
   a source of scrambler enabling and disabling signals coupled to one input of said OR gate;
   a source of reset signals connected to the second input terminal of said OR gate;
   the output of said OR gate being connected to the reset terminals of said flip-flops of said second series and to one input of said multiplexer;
   said NOR gate having two inputs and one output;
   two sources of two different clock signals coupled separately to the two inputs of said NOR gate;
   the output of said NOR gate being coupled to the data terminal of said first latch and the output terminal of said first latch being coupled to said multiplexer;
   a third source of clock signals coupled to the clock terminals of said first and second latches;
   the output of said multiplexer being connected to the data terminal of said second latch and the output terminal of said second latch being connected to one input of said multiplexer and to the data terminal of said third latch; and
   the output of said third latch being connected to the set terminals of all of the flip-flops in said first series.

4. A circuit for scrambling serial data in the form of frames of bytes of data wherein each frame of data includes identifying portions which are not data, said circuit comprising:
   a first series of seven flip-flops for generating a polynomial signal having the terms $1+X^6+X^7$;
   a master exclusive OR gate having two inputs and one output;
   a second series of eight flip-flops;
   each of said flip-flops in both series having a clock terminal, an input data terminal, an output data terminal, a set terminal and a reset terminal;
   a series of eight additional exclusive OR gates each having two inputs and an output;
   an eight bit serial-to-parallel register coupled to receive the serial data and providing eight outputs;
   an eight bit parallel-to-parallel register coupled to the eight outputs of said serial-to-parallel register;
   a first data bus comprising eight leads each of which is coupled to a respective output of said parallel-to-parallel register, said first data bus being further connected to a first input of each of said eight additional exclusive OR gates;
   the output data terminal of each flip-flop in said second series being connected to a second input of a respective one of said additional exclusive OR gates;
   one input of said master exclusive OR gate being connected to the output data terminal of the seventh of said first series of flip-flops and to the input data terminal of the eighth of said second series of flip-flops and the second input of said master exclusive OR gate being connected to the output data terminal of the sixth flip-flop in said first series and to the input data terminal of the seventh flip-flop in said second series of flip-flops;

the output of said master exclusive OR gate being connected to the input data terminal of said first flip-flop in said first series of flip-flops and to the input data terminal of said first flip-flop in said second series of flip-flops; and timing control means coupled to said two series of flip-flops for controlling the transfer of a polynomial scrambler signal from said first series of flip-flops through said second series of flip-flops to said series of additional exclusive OR gates in each of which a term of said polynomial and data are added.

5. A circuit for scrambling digital signals received in the form of a serial data bit stream comprising:

- a series of flip-flops arrayed in parallel for generating terms of a digital polynomial to be added to data signals, each flip-flop having an input terminal and an output terminal;
- a series of latches, each latch having an input terminal and an output terminal;
- a series of exclusive OR gates, each having two inputs and one output;
- an eight bit serial-to-parallel register coupled to receive the serial data and providing eight outputs;
- an eight bit parallel-to-parallel register coupled to the eight outputs of said serial-to-parallel register;
- a first data bus comprising eight leads each of which is coupled to a respective output of said parallel-to-parallel register, said first data bus being further connected to a first input of each of said eight exclusive OR gates; and
- a connection from the output of each latch to a second input of a respective one of said exclusive OR gates, wherein a scrambler signal and a data signal are added together.

* * * * *